Patented Nov. 13, 1951

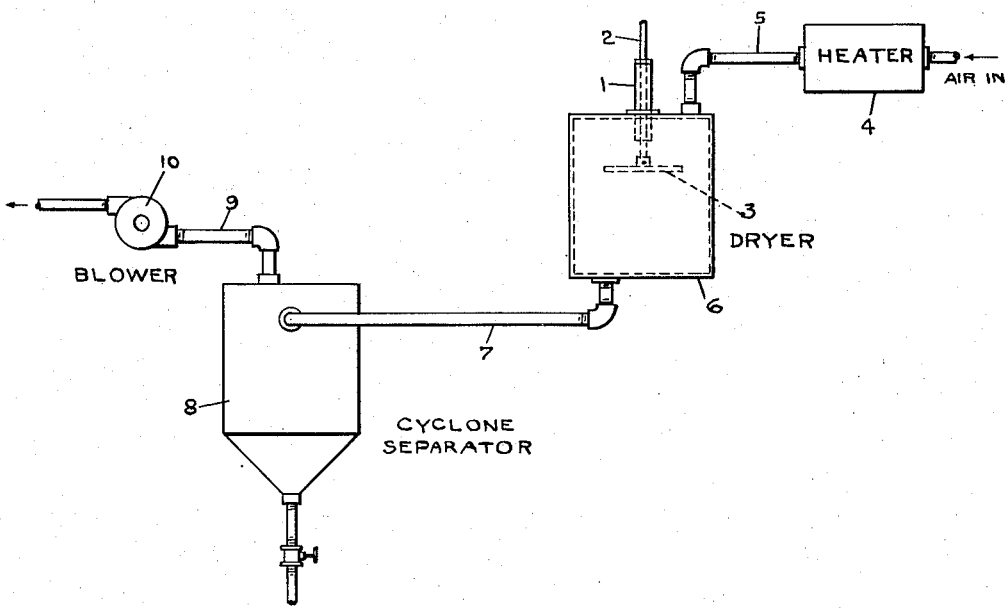

2,574,597

UNITED STATES PATENT OFFICE 2,574,597

SPRAY-DRIED DYESTUFF POWDERS COMPRISING LIGNIN SULFONATE

Victor S. Salvin, Irvington, and William J. Hart, Dover, N. J., assignors to Celanese Corporation of America, a corporation of Delaware Application March 3, 1949, Serial No. 79,408

5 Claims. (Cl. 8—79)

This invention relates to the preparation of dyestuff compositions and relates more particularly to the preparation of finely-divided powdered dyestuff compositions of improved dispersibility.

An object of this invention is the provision of powdered dyestuff compositions of substantially improved dispersibility and adapted to be employed for the dyeing of textile materials in fast, level shades which are substantially free of faults, such as spotting and the like.

Another object of this invention is the provision of an improved process for the production in a finely-divided, highly dispersible, dry particle form of heat-sensitive dyestuff compositions which, when dried in the usual manner, tend to agglomerate and to become difficult to disperse satisfactorily.

Other objects of this invention will appear from the following detailed description and the accompanying drawing.

The drawing is a diagrammatic showing of the manner in which our novel drying process may be carried out.

In the dyeing of textile materials employing aqueous media containing disperse dyestuff powders, the powders are usually produced by milling the particular dyestuff or mixture of dyestuffs employed with water to reduce the particle size, incorporating a surface-active agent or detergent in the milled dyestuff, drying the composition obtained to reduce the resulting dyestuff composition to a dry, powder form and then grinding the dry powdered composition to reduce the powder to a particle size passing a 300 to 400 mesh screen. In formulating said disperse dyestuff powders, the components must not only be compatible but must also be capable of yielding compositions which, after drying, are readily and completely dispersible in water. It is observed, however, that said compositions frequently fuse or sinter as a result of said drying operation to form large particles or agglomerates which do not disperse and which precipitate as an undesirable sediment in dyebaths prepared therefrom. This is especially true of dyestuffs having a relatively low softening temperature, e. g. 95 to 100° C. Subsequent grinding, no matter how extended or how intensive, does not seem to eliminate the agglomerates with the result that when the latter come in contact with the textile material being dyed, specks of deep color are obtained and a spotty effect is produced.

We have now found that disperse dyestuff powders of an unusually high degree of dispersibility and freedom from non-dispersible particle agglomerates may be obtained if said powders are prepared by a novel process which comprises milling a mixture of water, the desired dyestuff, a dispersing agent comprising lignin sulfonate and a neutral or alkaline inorganic salt of a cation which does not form insoluble soaps, atomizing the resulting slurry into finely-divided droplets and then drying the finely-divided liquid particles in a stream of heated air. Preferably, we employ air heated to a temperature of 212 to 300° F. When the aqueous mixture is so atomized that the size of the particles obtained after drying is effected is from 25 to 100 microns, disperse dyestuff powders of extraordinary dispersibility are obtained with the result that when said powders are dispersed in an aqueous medium to form a dyebath, substantially no sediment is formed. Consequently, dyeing is effected in a very efficient manner since all of the dyestuff is completely dispersed and utilized.

As examples of neutral or alkaline inorganic salts which may be employed, there may be mentioned sodium sulfate, potassium pyrophosphate, sodium phosphate, potassium chloride, lithium nitrate, potassium thiocyanate, sodium chloride, sodium pyrophosphate and sodium carbonate. The presence of these salts in the composition not only increases the dispersing efficiency of the lignin sulfonate but also reduces the solubility of the dyestuffs in the lignin sulfonate and prevents the formation of disperse dyestuff compositions which are low melting and which tend to sinter. In the finely-divided particles produced in accordance with our novel process, the lignin sulfonate appears in the dyestuff powder composition as a coating or an encapsulating film on the surface of the finely-divided dyestuff particles which enables the latter to be wet out instantaneously and completely and to be thoroughly dispersed when the dyestuff powder is placed in either hot or cold water or in a soap solution.

Our novel process may be carried out most effectively if the slurry which is milled and then divided into liquid droplets contains from about 25 to 40 parts by weight of lignin sulfonate, 25 to 40 parts by weight of the inorganic neutral or alkaline salt and 20 to 50 parts by weight of the dyestuff, on a total solids basis, with a sufficient amount of water present so that the total solids content of the slurry is from 30 to 50% by weight of the aqueous mixture.

The desired atomization of the milled slurry may be attained by feeding the aqueous composition comprising the dyestuff, lignin sulfonate and the inorganic salt on to a disc rotating at a high peripheral speed of about 4,500 to 10,000 feet per second or more. In order that the dried disperse dyestuff composition particles be obtained within the desired range of particle size, i. e. from 25 to 50 microns in diameter, the rate of feed to the disc should be correlated to the speed of rotation so that the desired degree of division is produced. Spraying through an atomizing nozzle may also be utilized as a method for reducing the initial aqueous slurry of the dyestuff composition to a spray of sufficiently fine droplets so that the particles obtained on drying the droplets will have a diameter of 25 to 100 microns. Preferably, the particles of the dyestuff compositions are reduced during the drying operation to a moisture content of from about 2 to 5% by weight. Overdrying so that the moisture content is reduced below about 2% by weight tends to cause a slow rewetting and solution of the lignin sulfonate which forms the matrix in which the dye particles are embedded.

To illustrate the manner in which the novel process of our invention may be carried out reference may be had to the accompanying drawing.

The milled aqueous dyestuff composition is fed through a hollow spindle 1 concentric with a driven shaft 2 having a disc 3 fixed to the end thereof. Shaft 2 is driven by suitable driving means, such as air turbine, at a peripheral speed of about 4,500 to 10,000 feet per second or more. The whirling motion and centrifugal force thus exerted causes the dyestuff composition to be thrown off, forming an extremely fine spray of liquid droplets having the solids suspended therein. Air, heated to a temperature of about 212 to 300° F. in a suitable heater 4, is drawn through a conduit 5 into the chamber 6 enclosing the rotating disc. The heated air flows parallel to the gravitational fall of the particles and carries the latter downward through a conduit 7 into a cyclone separator 8. Due to the whirling motion imparted thereto the dry particles impinge on the sides of the chamber and fall to the base of cyclone separator 8 and the air remaining is exhausted therefrom through a conduit 9 by means of an exhaust blower 10. Since the system operates on the suction side of the exhaust blower 10 which also acts to draw the entering air through heater 4, the entire system is under a pressure slightly below atmospheric pressure. Thus, even though the dyestuff composition is reduced to a particle size of from 25 to 100 microns, no dust escapes. The very small amount of dyestuff which is not removed in cyclone separator 8 and is exhausted with the air by exhaust blower 10 may be recovered by recycling the exhaust air back into heater 4. Normally, however, the amount of dyestuff which is not separated in cyclone separator 8 is extremely small. The dyestuff powder is withdrawn from separator 8 and is of the desired particle size to be employed directly in the formation of a dyebath.

In order further to illustrate our invention, but without being limited thereto, the following examples are given:

Example I 20 parts by weight of 2-chlor-4-nitro-6-brombenzene - azo - di - hydroxyethyl - meta - chloraniline, 10 parts by weight of lignin sulfonate and 10 parts by weight of potassium pyrophosphate are mixed with 60 parts by weight of water and the mixture obtained then milled for 48 hours. The milled paste is then reduced to finely-divided liquid droplets in the manner described above employing a rotating disc and the droplets then mixed with air heated to a temperature of 250° F. The air flow is adjusted so that the finely-divided particles are dried to a moisture content of 4.7% by weight. The dried dyestuff particles are then separated from the air in the cyclone separator. The dry particles obtained have a diameter of from about 25 to 100 microns. When dispersed in water and the dyestuff dispersion then filtered, substantially no agglomerates are found to be present. The dispersion is highly stable and no precipitated sediment is formed even on long standing.

Example II 13.3 parts by weight of 1-hydroxy-4-aminoanthraquinone, 13.3 parts by weight of lignin sulfonate and 13.3 parts by weight of potassium pyrophosphate are mixed with 60 parts by weight of water and the resulting paste milled for 48 hours. The paste is then atomized, as described, and the liquid droplets dried with air heated to a temperature of 300° F. The particles are dried to a moisture content of 5.19% by weight and have a particle size of from about 25 to 100 microns. When the dyestuff particles are dispersed in water and the dispersion formed is filtered, substantially all of the dyestuff passes through the filter and practically no agglomerates are found to be present. The dispersion is stable on long standing. The filter test and dispersion obtained are far superior to the filter test and dispersion of a dispersed dyestuff composition of the identical components which is prepared by milling and pan-drying followed by grinding to pass a 400 mesh screen.

Surprisingly enough when our novel spray drying process is carried out employing dispersed dyestuff compositions in which the dispersing agent employed is an alkyl-aryl sulfonate or like commercial dispersing agent, the results obtained are not at all comparable to those obtained when employing lignin sulfonate as the dispersing agent and incorporating a neutral or alkaline inorganic salt of the type heretofore described. A noticeably poorer degree of dispersion is obtained with the formation of an appreciable amount of sediment when dispersion is effected with a dispersing agent other than lignin sulfonate, which indicates that lignin sulfonate is peculiarly adapted for use in our process.

It is to be understood that the foregoing detailed description is given merely by way of illustration and that many variations may be made therein without departing from the spirit of our invention.

Having described our invention, what we desire to secure by Letters Patent is:

1. In a process for the production of disperse dyestuff powders, the steps which comprise milling a paste consisting of 20 to 50 parts by weight of a dyestuff, 25 to 40 parts by weight of lignin sulfonate and 25 to 40 parts by weight of an inorganic salt selected from the group consisting of neutral and alkaline salts of cations which are incapable of forming insoluble soaps, and water in such amount that the total solids content of said slurry is from 30 to 50% by weight of the mixture, reducing the aqueous milled slurry to finely-divided droplets, and drying the finely-divided droplets to a moisture content of from about 2 to about 5% by weight by bringing the latter into contact with heated air.

2. In a process for the production of disperse dyestuff powders, the steps which comprise milling a paste consisting of 20 to 50 parts by weight of a dyestuff, 25 to 40 parts by weight of lignin sulfonate and 25 to 40 parts by weight of an inorganic salt selected from the group consisting of neutral and alkaline salts of cations which are incapable of forming insoluble soaps, and water in such amount that the total solids content of said slurry is from 30 to 50% by weight of the mixture, reducing the aqueous milled slurry to finely-divided droplets, and drying the finely-divided droplets to a moisture content of from about 2 to about 5% by weight by bringing the latter into contact with heated air at a temperature of 212 to 300° F.

3. In a process for the production of disperse dyestuff powders, the steps which comprise milling a paste consisting of 20 to 50 parts by weight of a dyestuff, 25 to 40 parts by weight of lignin sulfonate and 25 to 40 parts by weight of an inorganic salt selected from the group consisting of neutral and alkaline salts of cations which are incapable of forming insoluble soaps, and water in such amount that the total solids content of said slurry is from 30 to 50% by weight of the mixture, reducing the aqueous milled slurry to finely-divided droplets, and drying the finely-divided droplets to a moisture content of from about 2 to about 5% by weight by bringing the latter into contact with heated air at a temperature of 212 to 300° F. and separating discrete dried particles of a diameter of 25 to 100 microns.

4. In a process for the production of a disperse dyestuff powder, the steps which comprise milling a paste consisting of 20 parts by weight of 2-chlor-4-nitro-6-brom-benzene-azo-di-hydroxy-ethyl-meta-chlor-aniline, 10 parts by weight of lignin sulfonate and 10 parts by weight of potassium pyrophosphate in about 60 parts by weight of water, reducing the aqueous milled slurry to finely-divided droplets, and drying the finely-divided droplets to a moisture content of 2 to 5% by weight by bringing the latter into contact with heated air at a temperature of about 250° F. and separating discrete dried particles of a diameter of from about 25 to 100 microns.

5. In a process for the production of a disperse dyestuff powder, the steps which comprise milling a paste consisting of 13.3 parts by weight of 1-hydroxy-4-amino-anthraquinone, 13.3 parts by weight of lignin sulfonate and 13.3 parts by weight of potassium pyrophosphate in about 60 parts by weight of water, reducing the aqueous milled slurry to finely-divided droplets, and drying the finely-divided droplets to a moisture content of 2 to 5% by weight by bringing the latter into contact with heated air at a temperature of about 300° F. and separating discrete dried particles of a diameter of from about 25 to 100 microns.

VICTOR S. SALVIN.
WILLIAM J. HART.

REFERENCES CITED

The following references are of record in the file of this patent:

UNITED STATES PATENTS

| Number | Name | Date |
| --- | --- | --- |
| 1,765,581 | Hall | June 24, 1930 |
| 1,796,028 | Jacek | Mar. 10, 1931 |
| 1,828,592 | Bommer | Oct. 20, 1931 |
| 1,908,993 | Metzger | May 16, 1933 |
| 1,978,763 | Reddelien | Oct. 30, 1934 |
| 2,005,303 | Spiegler | June 18, 1935 |
| 2,070,739 | Krauss | Feb. 16, 1937 |
| 2,150,692 | McNally | Mar. 14, 1939 |
| 2,181,800 | Crossley | Nov. 28, 1939 |
| 2,241,449 | Ellis | May 13, 1941 |
| 2,337,652 | Dreyfus | Dec. 28, 1943 |
| 2,342,191 | Grossmann | Dec. 22, 1944 |
| 2,413,420 | Stephanoff | Dec. 31, 1946 |